United States Patent
Chinn et al.

(10) Patent No.: US 8,144,334 B2
(45) Date of Patent: Mar. 27, 2012

(54) FIBER-OPTIC, DIGITAL SYSTEM FOR LASER DOPPLER VIBROMETERS (LDVS)

(75) Inventors: Stephen R. Chinn, Alexandria, VA (US); James D. Haberstat, Alexandria, VA (US); Bradley W. Libbey, Alexandria, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 346 days.

(21) Appl. No.: 12/568,752

(22) Filed: Sep. 29, 2009

(65) Prior Publication Data

US 2011/0174078 A1 Jul. 21, 2011

(51) Int. Cl.
  *G01B 9/02* (2006.01)
  *G01B 11/02* (2006.01)
(52) U.S. Cl. .......... 356/482; 356/486; 356/502
(58) Field of Classification Search .......... 356/28.5, 356/477, 482, 484, 485, 486, 502; 73/227.19, 73/227.27; 250/657
See application file for complete search history.

(56) References Cited

U.S. PATENT DOCUMENTS

| | | | |
|---|---|---|---|
| 4,436,425 A | | 3/1984 | Cole |
| 4,572,949 A | * | 2/1986 | Bowers et al. .......... 250/227.27 |
| 5,459,570 A | * | 10/1995 | Swanson et al. .......... 356/479 |
| 6,847,454 B2 | * | 1/2005 | Crowley et al. .......... 356/479 |
| 7,102,756 B2 | | 9/2006 | Izatt et al. |
| 7,242,481 B2 | * | 7/2007 | Shpantzer et al. .......... 356/502 |
| 7,961,332 B2 | * | 6/2011 | Kilpatrick et al. .......... 356/489 |
| 2006/0109477 A1 | * | 5/2006 | Zhou et al. .......... 356/479 |

OTHER PUBLICATIONS

"Local-oscillator excess-noise suppression for homodyne and heterodyne detection," G.L. Abbas et al, Optics Letters, vol. 8, Issue 8, pp. 419-421 (Aug. 1983).

"Blindness limitations in optical coherence domain reflectometry," S.R. Chinn et al, Electronics Letters, vol. 29, Issue 23, pp. 2025-2027 (Nov. 11, 1993).

"Synthetic-Heterodyne Interferometric Demodulation," James H Cole et al, IEEE J Quantum Electronics, Vol QE-18, Issue 4, pp. 694-697 (1982).

"Homodyne Demodulation Scheme for Fiber Optic Sensors Using Phase Generator Carrier," Anthony Dandridge et al, IEEE J Quantum Electronics, Vol QE-18, Issue 10, pp. 1647-1653 (1982).

"Integrated-Optical Single-Sideband Modulator and Phase Shifter," Fred Heismann et al, IEEE J. Quantum Electronics, vol. QE-18, Issue 4, pp. 767,771 (1982).

"Integrated Optical SSB Modulator/Frequency Shifter," Masayuki Izutsu et al, IEEE J. Quantum Electronics, vol. QE-17, Issue 11, pp. 2225-2227 (1981).

"The Acousto-Optic Effect in Single-Mode Fiber Tapers and Couplers," J. Lightwave Technology, vol. 14, Issue 11, pp. 2519-2529 (Nov. 1996).

"Optional interferometer designs for optical coherence tomography," Andrew M Rollins st al, Optics Letters, vol. 24, Issue 21, pp. 1484-1486 (Nov. 1, 1999).

* cited by examiner

*Primary Examiner* — Michael A Lyons
(74) *Attorney, Agent, or Firm* — Richard J. Kim

(57) ABSTRACT

An apparatus and method for non-determination of the surface velocity of a target using optical interference and Doppler shifting of the light reflected from the target are disclosed. It may be used to measure small-amplitude, acoustic frequency surface vibrations as well as non-periodic surface vibration.

19 Claims, 8 Drawing Sheets

FIBER-OPTIC, DIGITAL SYSTEM FOR LASER DOPPLER VIBROMETERS (LDVS)

GOVERNMENT INTEREST

The invention described herein may be manufactured, used, sold, imported, and/or licensed by or for the United States Government.

BACKGROUND OF THE INVENTION

Non-contact measurement of surface velocity can be done using an optical interference method and sensing the Doppler shift of reflected light from a target. If the target vibration is to be measured, the reflected light acquires a spectrum of sidebands from the range of vibrational frequencies at the target. This type of measurement differs in many details from that of a static, or quasi-static, velocity measurement such as in laser radar, or measurement of atmospheric aerosol velocities, although both rely on the same basic physical principles. In this specification, the invention is applied to measurement of small-amplitude, acoustic-frequency surface vibrations, but is also applicable to special cases of non-periodic velocities as well.

DESCRIPTION OF THE PRIOR ART

In past implementations, laser Doppler vibrometers (LDVs) have used standard interferonrietric techniques to sense dynamic optical phase changes in the beam reflected or scattered from a vibrating target. Usually such vibrometers use bulk optical components and free-space optical beams. Also, using conventional Mach-Zender or Michelson interferometers, significant inherent optical power loss (e.g., about 6 dB) occurs in the beam splitters from splitting the light into unused beam paths.

Generally, the preferred method of laser Doppler vibrometry shifts the sensor's time varying signals to a higher frequency to eliminate velocity directional ambiguity and to lessen the additional electronic noise typically found near zero frequency (DC). Many commercially available LDVs accomplish this by using an optical frequency offset in a frequency-shifted self-heterodyne (or offset homodyne) detection method. Typically this offset is provided by putting the reference optical beam through an acousto-optic modulator (AOM) crystal to shift the optical carrier frequency. When this reference beam is combined with the reflected beam from the target onto a photodiode, the time-varying heterodyne signal containing the target's vibrational modulation is centered about this intermediate frequency offset. Usually, to obey the physical constraints of the AOM, this frequency is tens of MHz or higher. Often, this high intermediate frequency is electrically mixed to yet lower frequencies for subsequent frequency demodulation, in order to extract the target's vibrational velocity spectrum. To avoid electrical down-conversion, and to obtain a smaller frequency offset, sometimes two AOMs are used in tandem, with large opposite shifts at a differential frequency. Another high-frequency single-sideband frequency offset method has been reported using a complex electro-optic phase modulator structure (IEEE J. Quantum Electronics, Vol. QE-17, Issue 11, 1981, pp. 2225-2227, the entire disclosure of which is herein incorporated by reference). This leaves small undesired vestigial sidebands, is expensive, and has not been widely utilized. Another complex integrated optical inter-digitated mode-coupling structure has been proposed for frequency shifting, (IEEE J. Quantum Electronics, Vol. QE-18, Issue 4, 1982, pp. 767,771 incorporated herein by reference). In fiber optic systems, special fiber and acoustic transducers have been used for frequency shifting in different versions of AOMs, but such devices are as complex as ordinary AOMs and require specialized fibers (J. Lightwave Technology, Vol. 14, Issue 11, 1996, pp. 2519-2529, incorporated by reference in its entirety).

SUMMARY OF THE INVENTION

In this specification, we describe a novel combination of features that lead to a robust, flexible, and sensitive LDV that is based on fiber-optic and digital signal processing (DSP) technology. The important features, briefly summarized, include:

An interferometer that conserves optical power by using a non-reciprocal optical circulator.

Polarization-maintaining (PM) fiber-optic lines are preferably used to improve efficiency; the only exception being the free-space path from a fiber launch to the vibrating target. Standard single-mode optical fiber and fiber optic components are preferably designed for operation in the 1300-1600 nm wavelength range.

An optical fiber phase modulator to operate at a frequency ($\Omega_p$) higher than the acoustic signal spectrum, yet low enough to allow easy analog-to-digital conversion (ADC) without analog down-conversion.

A double-balanced photo-receiver to maintain optical power efficiency, double the detected photo-current signal, and eliminate common-mode source noise.

An eye-safe, narrow line width, fiber-coupled, semiconductor laser to preferably operate in the 1550 nm region using low power.

A digital signal process to demodulate the received optic signal.

In addition, components for use in this design have the advantage of being commercially available, off-the-shelf items.

DETAILED DESCRIPTION

I. System Overview

Figure 1:
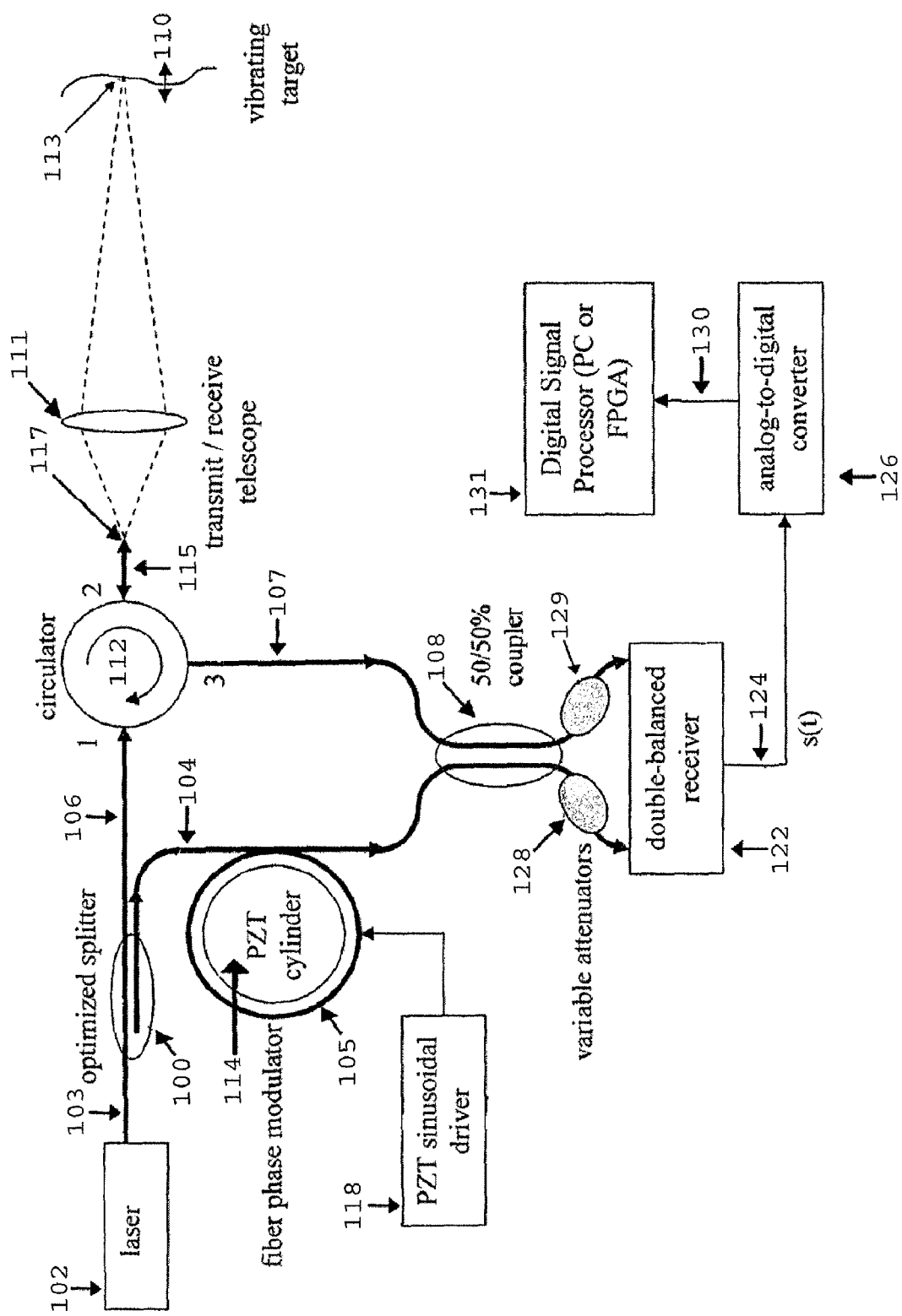
FIG. 1 is a schematic representation of a Fiber-Optic Laser Doppler Vibrometer (LDV) System with phase modulation according to one embodiment of the invention.

Interferometer: An interferometer based on a variant of the Mach-Zender interferometer includes a laser 102. A first beam splitter 100 in the interferometer separates a portion of a laser output 103 into a heterodyne reference beam 104 and a target beam 106. All beams described herein and in FIG. 1 are fundamental guided modes within polarization-maintaining single-mode fiber, except for the free-space portion indicated by dashed lines. A small portion of a source power is distributed to the reference beam 104 to overcome receiver noise; more than this amount causes unwanted shot-noise. The remaining power is distributed to the target beam 106 where it is necessary to overcome scattering and absorption, and path propagation loss from a target surface 110. Instead of a beam splitter directing energy to the target 110, a non-reciprocal optical circulator 112 is used. The non-reciprocal optical circulator 112 has the property of routing a reflected beam 115 coming from the target 110 into a new fiber connected to the circulator 112 at port 3, rather than splitting the reflected beam and directing a portion back to the source. Both the reference 104 and reflected 107 beams are recombined in the 2×2 50/50% beam splitter 108, and both output ports are used. This design is based in part on an architecture described in Optics Letters, Vol. 24, Issue 21, 1 Nov. 1999, pp. 1484-1486 by A. M. Rollins and J. A. Izatt, developed for broad-spectrum optical coherence tomography (but lacking coherent vibration demodulation and detection). See also U.S. Pat. No. 7,102,756 by the same authors. The path-matching delay line as found in Optics Letters, Volume 24, Issue 21, 1 Nov. 1999, pp. 1484-1486 (herein incorporated by reference in its entirety) is replaced by an ultrasonic frequency phase modulator 114, as will be more fully understood from the following description.

Polarization maintaining fiber: Efficient heterodyne detection requires that the polarizations of the reference and target (reflected) beams be the same. This condition is ensured by launching a linearly polarized laser into PM fiber 103 and using PM fiber components throughout the system. To the extent that the scattered signal (reflected beam) is depolarized by the target, detection efficiency will be degraded. In principle, this can be mitigated by using a polarization-diversity receiver but at the cost of nearly doubling the number of optical components and detectors. Non-PM fibers can be used if suitable variable polarization control devices are placed in the system to align the reference and target polarizations. Generally, environmental drift of the polarization states will occur, requiring frequent readjustment for this type of system. The type of energy-conserving Mach-Zender interferometer used does not allow for convenient insertion of non-reciprocal Faraday mirrors, which can also be used to undo polarization drift, but add cost and complexity to the system. Use of PM fiber and components is the simplest, most direct means of maintaining heterodyne polarization alignment.

Optical fiber phase modulation: The method described herein uses periodic phase modulation of the reference beam rather than using a constant frequency offset. This effect is produced by sinusoidally varying the length of the reference beam's fiber 105 by a fraction of an optical wavelength. In contrast, traditional modulation shifts the frequency with a single-sideband acousto-optic modulator (AOM). An optical fiber phase modulation 114 is implemented by propagating the reference beam 104 through a length of fiber 105 wound around a piezo-electric (PZT) cylinder 116. The cylinder's diameter is sinusoidally modulated by use of driver 118 by applying a voltage across its wall thickness via an inner electrode 119 and outer electrode 120. The optical fiber 105, wrapped N number of turns around the PZT 116, will change in length, e.g., will stretch when the cylinder's $D_f$ is increased. By varying the number of turns N, any desired modulation can be achieved, and although N is preferably an integer of 1 or greater, it does not have to be an integer. Sinusoidal phase modulation provides the same functionality as optical carrier frequency shifting, but on a multi-sideband basis.

The phase coherence properties of the detected signal (reflected beam) are used on a sideband-by-sideband basis to produce in-phase (I) and quadrature (Q) signals suitable for frequency (rather than amplitude) demodulation. The required phase modulation frequency is determined primarily by the width of the vibrational spectra to be measured. The modulation sidebands should be spaced wider than the signal bandwidths, to allow for filtering of the modulation sidebands.

Figure 3:
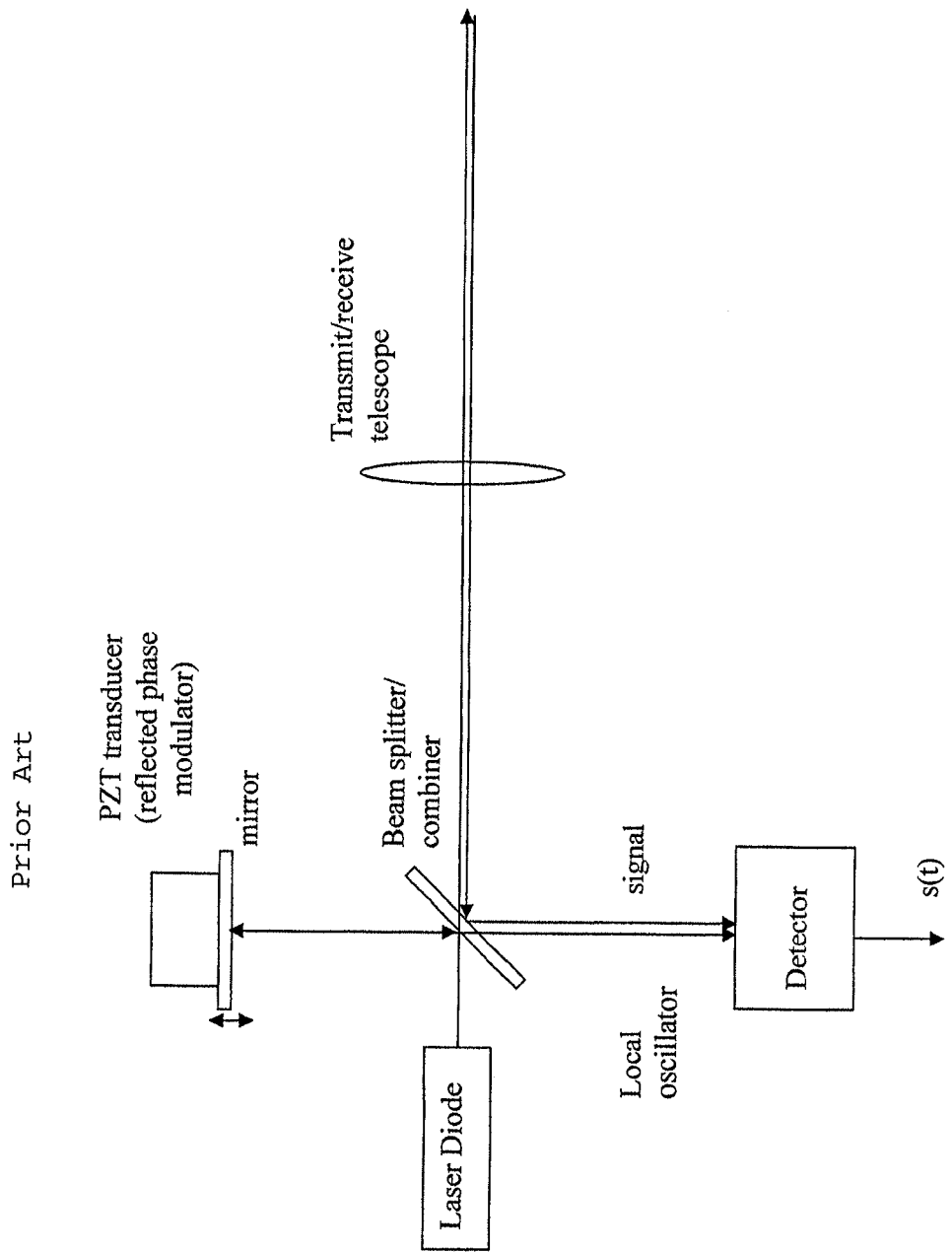
FIG. 3 is a schematic representation of free-space heterodyne sensor optics with phase modulator as found in the prior art.

Related prior art in optical coherence tomography as discussed in Electronics Letters, Vol. 29, Issue 23, 11 Nov. 1993, pp. 2025-2027 herein incorporated by reference in its entirety, used a superficially similar method to provide low frequency phase modulation in one arm of a low-coherence interferometer, the goal was to obtain reflectivity amplitude information from a static target, with signal detection aided by shifting the signal from baseband to audio frequencies (a few kHz). Upon detection, the optical phase modulation was converted to amplitude modulation proportional to the intensity of the reflected signal. Use of two modulation sidebands allowed for elimination of optical phase drift with respect to the PZT modulator drive. Also, prior art in vibration measurement by optical frequency demodulation (as disclosed by Dandridge et al. in IEEE J. Quantum Electronics, Vol. QE-18, Issue 4, 1982, pp. 694-697 incorporated herein by reference) used an analog frequency demodulation scheme similar to that described herein, but with free-space beams and phase modulation provided by mounting a mirror to a vibrating PZT element in a bulk optic Michelson interferometer (FIG. 3). Situations where the signal could fade from phase nulling conditions were not included by Dandridge et al., nor was digital signal processing and demodulation. An "I" and "Q" demodulation is performed at each of the fundamental and harmonic sidebands to avoid this. A somewhat similar modulation concept was described in IEEE J. Quantum Electronics, Vol. QE 18, Issue 4, 1982, pp. 694-697 and U.S. Pat. No. 4,436,425, (each incorporated herein by reference), but mixed the output carrier frequency to the third harmonic, requiring larger system bandwidth or higher data sampling rates.

With reference again to FIG. 1, a double-balanced photoreceiver 122 is shown: Receiver 122 is used with two matched photo-diodes, not shown, operated in differential mode to detect the signal. The splitting ratio of a fused 50/50% fiber coupler 108 is chosen to optimize the signal-to-noise ratio at a photodetector 122. This has several advantages: (i) each optical output port of the reference and target beam (reflected) combiner 108 is used, thus conserving power; (ii) the nature of the phase shifts in the beam combiner causes the differential output signal 124 to double; and (iii) common-mode amplitude noise from the semiconductor laser source is reduced. This concept was described in Optics Letters, Vol. 8, Issue 8, August 1983, pp. 419-421 (incorporated herein by reference), with bulk optics implementation.

Eye-safe semiconductor laser 102: A laser wavelength, near 1550 nm is nearly 100 times safer than wavelengths below 1400 nm. This allows use of powers higher than are typically used in commercial 632 nm or 800 nm LDVs; higher power enhances return reflected signal and the sensitivity of the LDV. Laser 102 may be, e.g., a semiconductor diode, distributed feedback, single-wavelength laser that has a coherence length long enough for this application without having to balance the path lengths in the interferometer.

Digital signal processor 131: The balanced receiver output signal 124 is digitized by an analog-to-digital converter (ADC) 126 computer card to produce a digital signal 130. Use of modulation frequencies on the order of 100 kHz allows convenient, inexpensive, high-resolution conversion. The digital signal processing that takes place on processor 131 is described below and illustrated in FIG. 4. The output of this process produces target velocity data and may be streaming, real-time digitized target velocity signals or converted with spectral analysis to frequency data.

II. System Operation of a Preferred Embodiment of the Invention

In one embodiment, a heterodyne interferometer 10 is constructed of a commercial telecommunications-type laser diode 102 connected to fiber optics splitter 100, as shown in FIG. 1. In this implementation, the wavelength, λ, is 1550 nm, the output power is 20 mW, and the light (beam) is linearly polarized along the slow-axis of the PM fiber output pigtail 102. The diode has an internal optical isolator (not shown), reducing its susceptibility to optical feedback.

The PM fiber output pigtail of the laser 102 is connected to a three-port fiber beam splitter 100 (referred to above as a first beam splitter) that directs most of the power (90%) into the target beam 106 and a small portion (10%) of the power to the reference beam 104. The high power level of the target beam 106 is needed to compensate for low reflectivity values of the target 110 and to compensate for spherical spreading of the reflected scattered beam 115 from the target. The power splitting ratio may be optimized for particular systems, to provide sufficient optical heterodyne gain with minimum shot noise.

The target beam 106 passes into the output/return circulator 112 (non-reciprocal optical circulator) at port 1, and exits at port 2. At the fiber tip 117, the target beam 106 expands until it reaches the focusing lens 111, which brings it to a small focal spot 113 at the vibrating target 110. The target 110 is assumed to be a rough surface which scatters light in a non-specular manner. A portion of this scattered light 115, whose phase is modulated by the target vibration displacement, is collected by the same focusing lens 111 and focused back into the fiber tip 117 and transmitted to circulator 112 at port 2. The return beam 107 then exits the circulator at port 3.

The optical field at the collection lens results from a random speckle pattern caused by the rough target surface. However, because of the nearly diffraction-limited nature of the focal spot 113, the size of the speckle lobe matches the collection aperture, so the returned target field has a nearly uniform phase distribution over the collection aperture. This means that heterodyne mixing integrated over the aperture will be very efficient. If the speckle field were finer-grained at the collection aperture, this would not be true and the phase averaging over several speckle lobes would give a reduced signal. From the antenna theorem, the mixing product at the telescope aperture will be the same as that at the photodiode.

Figure 2:
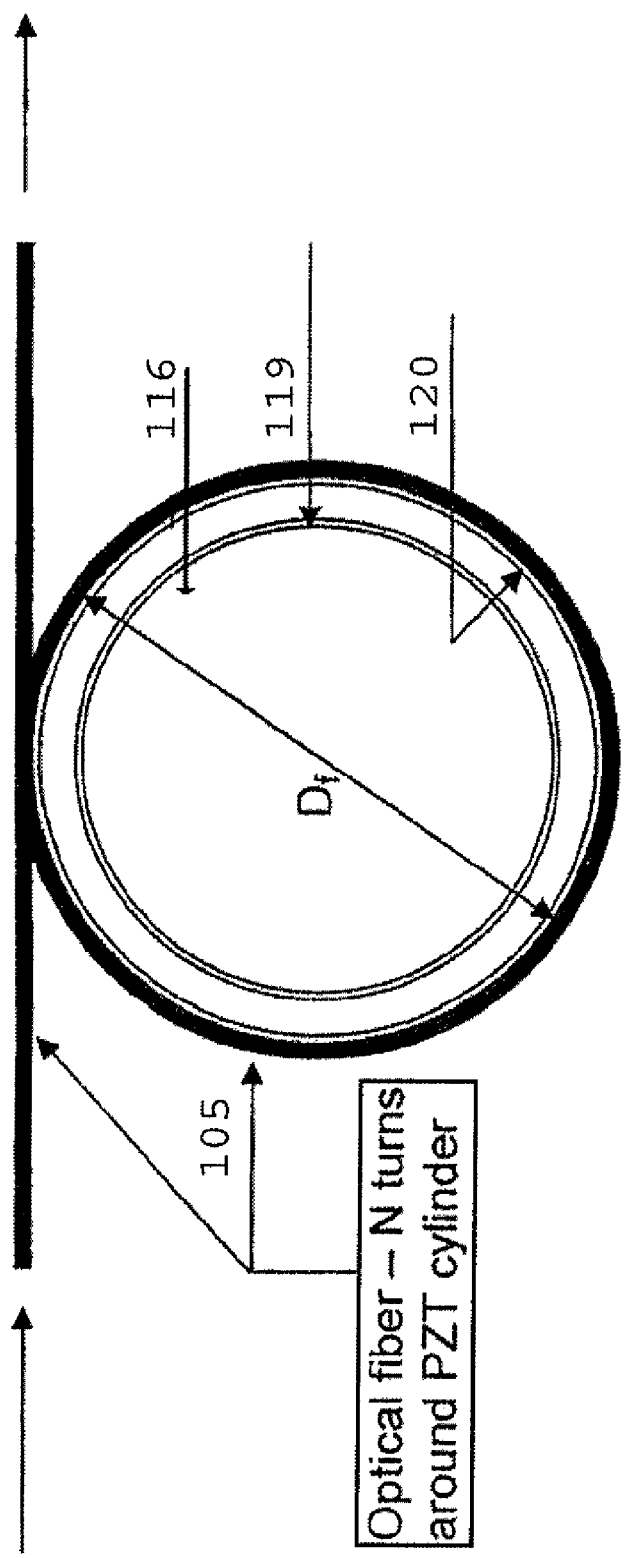
FIG. 2 is a schematic representation of a phase modulator implemented using fiber stretching.

The reference beam power level is chosen to overcome receiver noise; typically low power is sufficient to obtain enough heterodyne gain to exceed thermal and amplifier noise, without introducing excessive shot noise. This beam is modulated on its path through N turns of optical fiber whose length changes sinusoidally due to expansion/contraction of a piezoelectric cylinder 116 on which it is wound, FIG. 2. The time-dependent optical phase shift caused by stretching the fiber length is $$\varphi_{ref}(t) = \frac{2\pi}{\lambda} n_f \Delta L_f(t) = \frac{2\pi}{\lambda} n_f N\pi\Delta D_f \cos(\Omega_p t + \chi) \equiv k_p \cos(\Omega_p t + \chi),$$

where $n_f$ is the fiber index of refraction (approximately 1.46), $\Delta L_f$ is the time-dependent change in fiber length, N is the number of fiber turns around the PZT cylinder, and $\Delta D_f$ is the amplitude of PZT diameter modulation. The radian modulation frequency is $\Omega_p$ and $\chi$ is a possible phase shift between the applied modulation voltage and the phase response. For example, to obtain an optical phase shift of π would require the fiber to stretch by 527 nm, corresponding to piezoelectric diameter change of 17 nm when 10 fiber turns are present. This is achievable with typical PZT cylinders when tens of volts are applied across the thickness of the cylinder. The cylinders also exhibit resonant behaviors that significantly increase the displacement of the cylinder at some frequencies even when the modulation voltage amplitude remains constant. Unique in this application, the resonant behavior is used to choose appropriate dimensions of the PZT cylinder and modulation frequency such that resonance reduces the required PZT drive voltage by an order of magnitude.

The new method of demodulating this multi-sideband heterodyne signal can provide exactly the same target velocity spectrum as the conventional AOM method, with smaller intermediate frequencies and lower cost. The sinusoidal phase modulation of the reference beam imposes sidebands on the optical carrier at multiples of the modulation frequency with Bessel function weighted amplitudes. The photodiode signal is proportional to the intensity of the combined reference and target field phasors, but due to optical mixing this dynamic signal contains the modulation sidebands and time-dependent target information content centered on zero frequency instead of the optical frequency.

Although not wishing to be bound by the following theory, it is believed that the invention is implemented as follows:

The phase modulation imposed by the PZT on the reference beam fiber is $k_p \cos(\Omega_p t + \chi)$, and the optical carrier frequency is $\omega_o$, so the reference beam is given by $$E_{ref} = \exp[j\omega_o t + jk_p \cos(\Omega_p t + \chi)].$$

The complex phase modulation of the target beam is $\phi(t)$ and contains the narrow baseband spectrum of the target vibration. The reflectivity and collection factor is r, so the target beam is represented by $$E_s = r \exp[j\omega_o t + j\phi(t)].$$

After recombination in the final 2×2 50/50% optical splitter/combiner, the total complex electric field collected at each of two photodiodes at the outputs of attenuators 128 and 129 in the balanced receiver is (apart from a phase factor)

$$E = E_{ref} + E_s$$

where $E_{ref}$ is the optical field of the frequency modulated reference beam, and $E_s$ is that of the beam reflected from the target. The photodiode cannot respond directly to the optical carrier frequency, so its real-valued output photocurrent is proportional to $$i_D = |E_{ref}|^2 + |E_s|^2 + E_{ref}^* E_s + E_{ref} E_s^*$$

where an asterisk denotes a complex conjugate. If the differential gain of the balanced receiver is high, it may be necessary to use variable optical attenuators to balance the average powers (mostly the reference beam power) into each photodiode and prevent receiver saturation if the beam combiner ratio is not exactly 50%. Because of the phase shift induced in the 50/50% coupler 108, and the signal subtraction in the double-balanced receiver 122, the output signal 124 is approximately twice the signal from each photodiode.

The photocurrent beat signal out of the photodiode is proportional to $$s(t)=Re[E_{ref}E_s^*]=Re[re^{jk_p\cos(\Omega_p t+\chi)}e^{-j\phi(t)}].$$

This expression omits the photodiode optical responsivity factor, typically on the order of 1 A/W. The first exponential term is $$e^{jk_p\cos(\Omega_p t+\chi)} = \sum_{n=-\infty}^{\infty} j^n e^{jn(\Omega_p t+\chi)}J_n(k_p) = \sum_{n=-\infty}^{\infty} j^n e^{jn\chi}e^{jn\Omega_p t}J_n(k_p) = Z,$$

where $J_n(k_p)$ is the n-th order Bessel function of the first kind.

The terms in Z at the lowest harmonic frequency (the applied modulation) are $$Z_1=2jJ_1(k_p)\cos(\Omega_p t+\chi)=2jJ_1(k_p)\{\cos\chi\cos\Omega_p t-\sin\chi\sin\Omega_p t\},$$

and the terms in Z at the second harmonic frequency are $$Z_2=-2J_2(k_p)\cos(2\Omega_p t+2\chi)=-2J_2(k_p)\{\cos 2\chi\cos 2\Omega_p t-\sin 2\chi\sin 2\Omega_p t\}.$$

Figure 4:
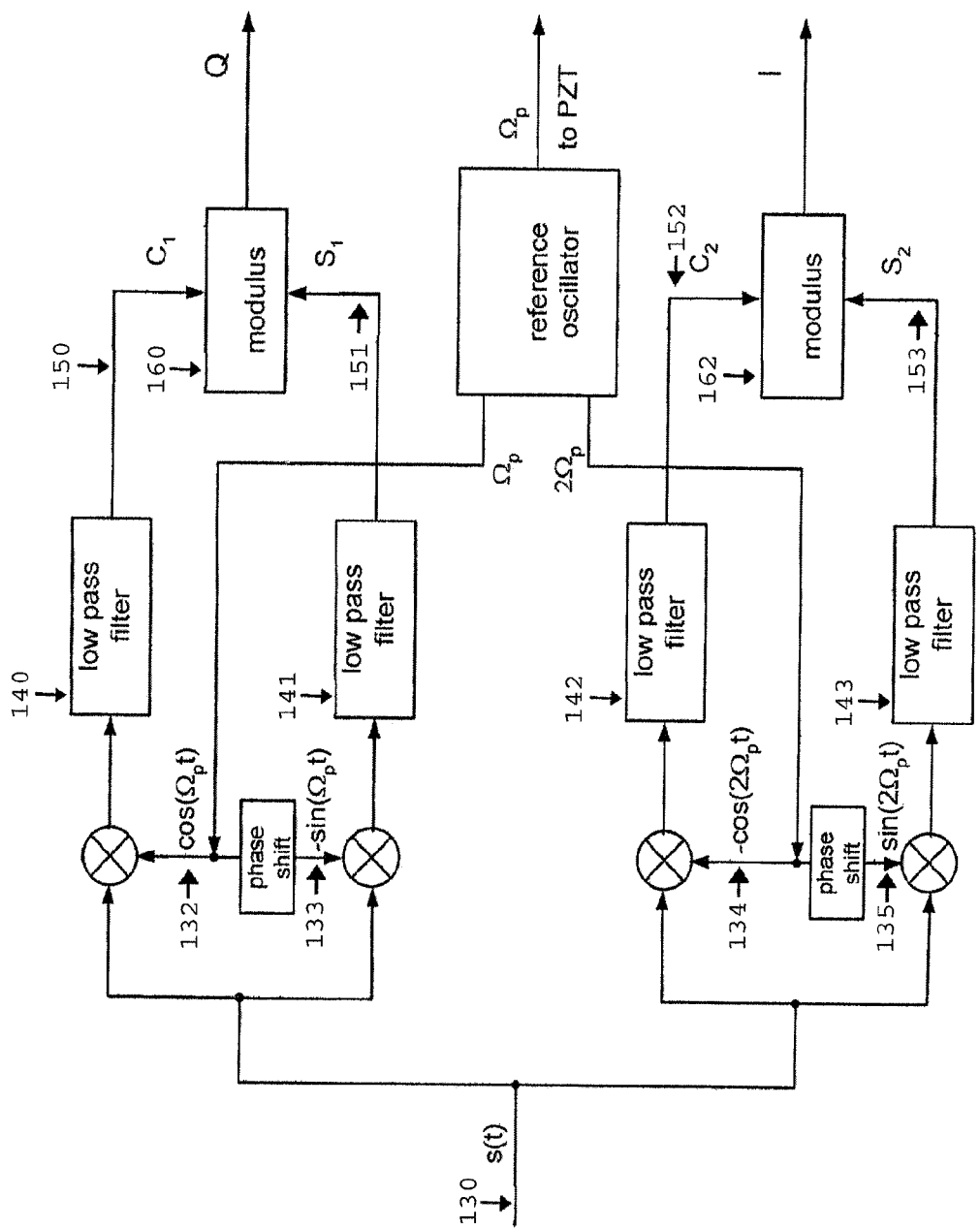
FIG. 4 is a schematic representation of dual-side-band demodulator circuit.

The cosine expressions have been expanded to facilitate identification of the various mixing nodes in the mixing/demodulation process illustrated in FIG. 4.

In its unexpanded form, the real-valued low frequency output from the photodiode receiver can be expressed as $$s(t)=r\{2J_1(k_p)\sin[\phi(t)]\cos(\Omega_p t+\chi)-2J_2(k_p)\cos[\phi(t)]\cos(2\Omega_p t+2\chi)\}$$

where unused terms near DC have been omitted. This output signal 124 is digitized and subsequently demodulated as illustrated in FIG. 4. The process first mixes the output signal 124 with quadrature components 132, 133, 134 and 135 at the first and second sideband frequencies. The phase shifters in FIG. 4 are shown to illustrate conventional analog concepts, but in digital processing, multiplication may be performed directly using the sine and cosine functions. The output of these four channels is then passed through low-pass filters (LPF) 140, 141, 142, and 143 to remove the non-base-band mixing products. The bandwidth of these filters 140, 141, 142 and 143 should exceed the bandwidth of the vibrational spectra of the target. This results in the following signals 150, 151, 152, and 153.

$$C_1=rJ_1(k_p)\cos\chi\sin\phi$$

$$S_1=rJ_1(k_p)\sin\chi\sin\phi$$

$$C_2=rJ_2(k_p)\cos 2\chi\cos\phi$$

$$S_2=rJ_2(k_p)\sin 2\chi\cos\phi$$

The 'modulus' 160, 162 function indicates the operation of eliminating the unknown phase angle $\chi$, for example $$Q=sgn(C_1)\sqrt{C_1^2+S_1^2}.$$

Alternatively, trigonometric relations can be used to eliminate $\sin\chi$ and $\cos\chi$. The modulus operation provides the in-phase (I) and quadrature (Q) vibrational signals $$Q=rJ_1(k_p)\sin\phi$$

$$I=rJ_2(k_p)\cos\phi$$

At the output of this demodulator front end, the in-phase (I) and quadrature (Q) vibrational signals are the same as those that can be input to a conventional frequency demodulator, which uses either analog or digital demodulation methods. The goal is to recover the surface velocity of the target, which is proportional to the Doppler frequency (or time derivative of the phase). The target vibrational velocity is $$v(t) = \frac{\lambda}{4\pi}\frac{d\varphi}{dt} = \frac{\lambda}{4\pi}\varphi'$$

and the phase derivative is $$\varphi' = \frac{I(t)Q'(t) - I'(t)Q(t)}{I^2(t) + Q^2(t)}.$$

In a digital sampled representation, the time derivatives can be replaced by finite difference approximations for the sampled data points. Alternatively, optimized DSP differentiation filters may be used. Note that in this method (or any other FM demodulation technique) the amplitude of the reflected optical signal plays no role as long as it is provides a receiver output signal sufficiently above system noise. This algorithmic method avoids the requirement for a hard-limiting amplifier to overcome amplitude changes in the receiver signal prior to frequency demodulation.

All processing operations shown here are at frequencies below the maximum signal frequency in the second-harmonic sideband so the entire demodulation process can be performed using digital processing. The mixing operations in FIG. 4 can be either analog, or digital as in the present system. The low-pass filtering can be performed using analog components or digital signal processing, We have used time-domain convolutional filters that allow for real-time signal processing or post-processing on saved data, but other filtering options may be optimal.

Figure 5:
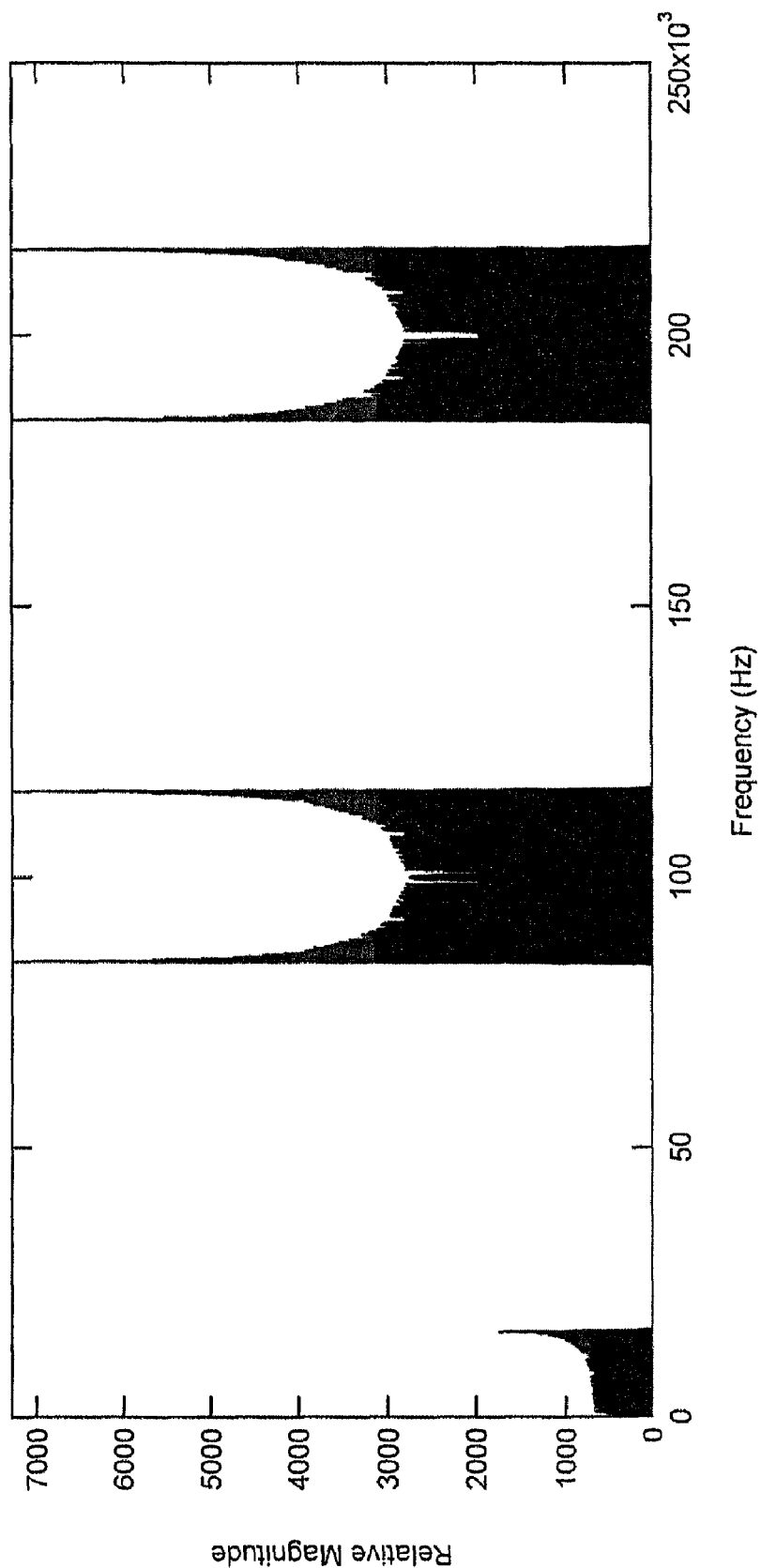
FIG. 5 is a representation of a simulated spectrum of a sensor diode signal.
Figure 6:
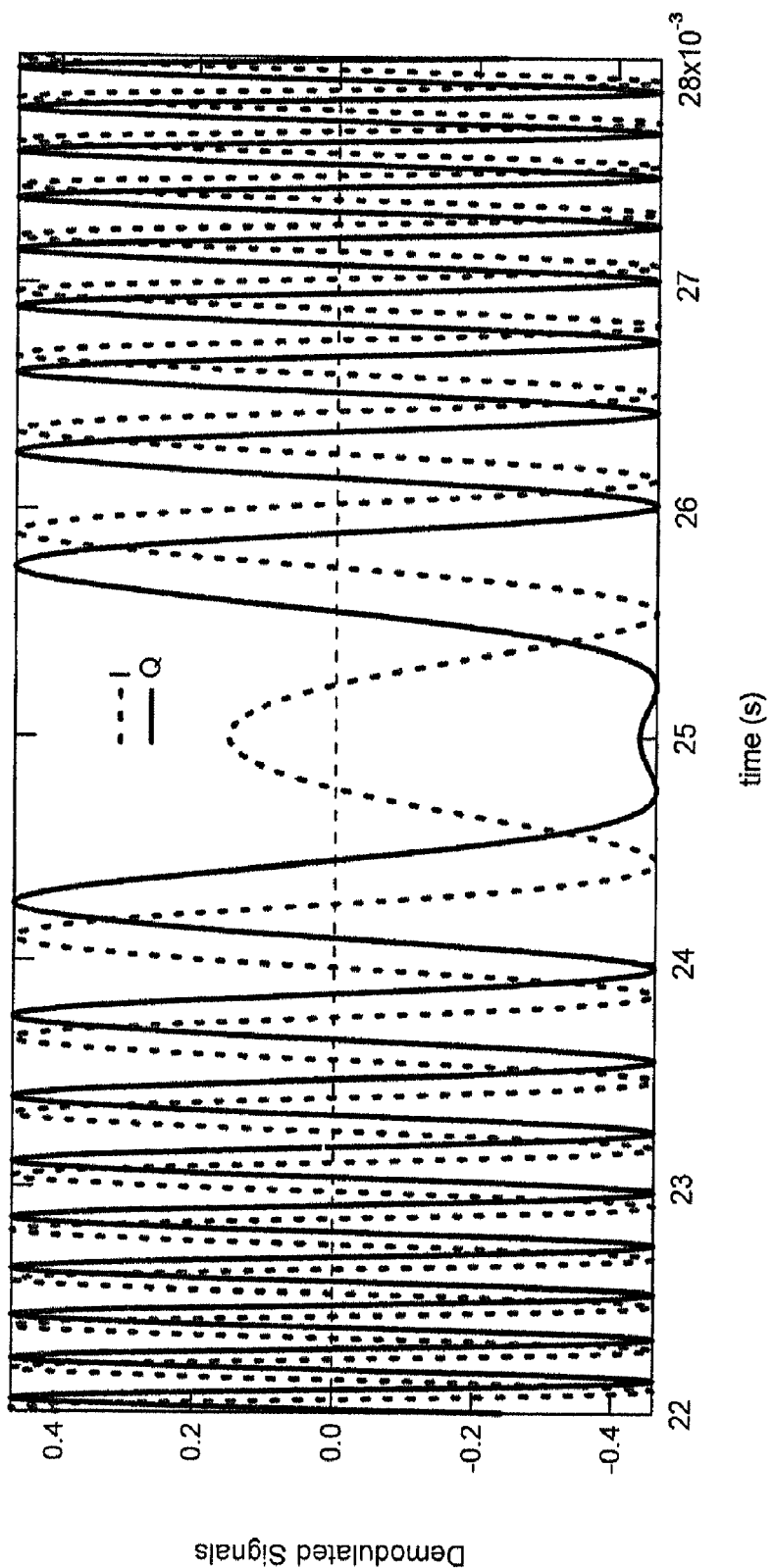
FIG. 6 is a graphic representation of the result of minimal processing of the signal of FIG. 5.

To illustrate the present frequency-demodulation concept more clearly, a simulated spectrum of a sensor diode signal is shown in FIG. 5. It is a result of 100 kHz reference modulation and a multi-frequency target vibration with a dominant tone having modulation depth $1\times10^5$ at a frequency of 20 Hz. The figure shows the DC and first two positive modulation sidebands with the smaller higher-order sidebands off the horizontal scale. A very large depth of dominant low-frequency vibrational modulation was deliberately used to produce FM spectral intensities approaching the classical inverse sine distribution. FIG. 6 shows the result of numerical processing of that signal, using the demodulation operations of FIG. 4. Subsequent frequency demodulation of the I and Q signals reproduce the multi-tone vibration signal (not shown).

Part of the complexity of the demodulation arises from uncertainty between the PZT drive phase and the phase, $\chi$, it induces on the reference fiber at each of the frequencies $\chi_p/2\pi$ or $2\Omega_p/2\pi$. The signals proportional to $\sin\chi$ and $\cos\chi$ or $\sin 2\chi$ and $\cos 2\chi$ are used to eliminate the phase shift. Alternatively, the phase lag can be measured, and an appropriate phase shift inserted in the PZT drive signal, so that the modulated phase lag with respect to the reference oscillator vanishes. Also, by monitoring the $S_1$ and $S_2$ signals it is possible to perform closed loop adjustment of the output phase of the PZT driver so that $\chi$ is always zero.

It is important that the depth of modulation from the PZT be such that $J_1(k_p)=J_2(k_p)$, so the signals denoted by $S_1, C_1$ and $S_2, C_2$ have the same factor multiplying their baseband signal terms. This first occurs at a modulation depth $k_p=2.630$. Numerical simulations show about a 5% tolerance on this modulation depth.

An additional concern for demodulation comes from differences in the clock controlling the frequency of the PZT and the digital sampling clock (ADC). The oscillator frequency that is used to drive the PZT would ideally match that of the digital demodulation process which may be accomplished using a common oscillator, but this is not essential. The PZT and ADC synchronization need not be phase-locked or derived from the same master oscillator. If the sample rate is not phase-locked with the PZT drive, a one-time calibration can be used to synchronize PZT frequency and with the demodulation frequency, using one of the clocks as a reference. This means that the sampling frequency does not need to be an exact multiple of the PZT drive frequency, only that the two frequencies are accurately referenced to each other. For example, the ADC clock-rate and PZT drive frequency must be stable enough so that the drift of the calibrated PZT frequency and the nominal clock frequency is negligible during the data acquisition interval. In practice, we digitize the PZT drive signal and do a fine adjustment on the numerical demodulation frequency from its nominal rate (referenced by the ADC clock).

III. Experimental Results

The system shown in FIG. 1 was assembled using commercially available components. We wound the phase modulator simply by wrapping multiple turns 105 of a 250 µm-cladding PM fiber pigtail around a standard PZT cylinder 116 having inner 119 and outer 120 wall electrodes. For this system, assembled to verify the design concept and allow interchange of components, all fiber parts had FC/APC (FC type with angle polish) connectors with keys oriented to the PM fiber slow-axis. The connectors were mated using standard fiber barrel adapters. An improved system would have these connections replaced with fiber fusion splices.

The focusing lens 111 was a standard 25.4 mm-diameter, 50 mm-focal-length achromat doublet, anti-reflection (AR) coated for the 1050-1620 nm band. The AR coating, plus FC/APC angled launch, effectively suppressed reflections from the free-space beam coupling. For the data presented here, the target distance at the focus point was adjusted to be about 15 cm.

The target 110 was a small matte-surface block of aluminum attached to the shaft of a magnet-coil shaker, driven by a variable-amplitude, variable-frequency signal generator (not shown) in the acoustic frequency range. The PZT actuator was driven by a similar signal generator in the ultrasonic band (100 kHz), followed by a voltage amplifier.

The input powers to the balanced receiver 122 were adjusted with variable attenuators 128, 129 by verifying that the receiver electrical output signal was in the middle of its operating range, and was not saturating. The receiver had a bandwidth of DC-80 MHz. The output signal 124 was used to examine the time-varying output on an oscilloscope, or the broad-band spectral content on an RF spectrum analyzer. During data acquisition, the balanced receiver output signal 124 was fed into a standard PCI-bus ADC card in a PC, set for a sampling rate of 500 kHz. Data sampled over brief time intervals ($\leq 0.5$ s) were stored and then processed with various PC-coded programs. In future systems, the data acquisition control and demodulation process could be implemented in firmware on FPGA circuits.

Figure 7:
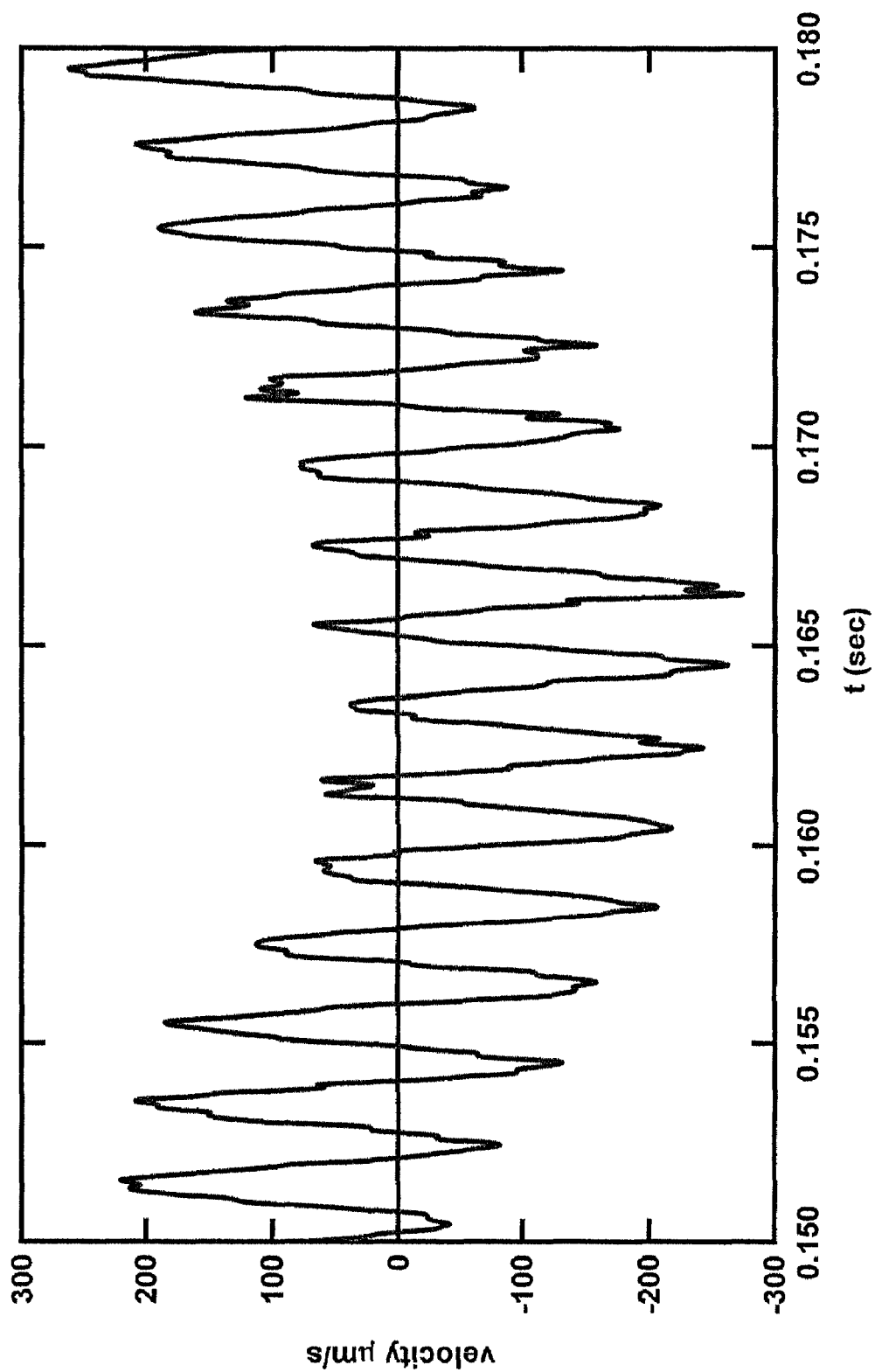
FIG. 7 shows an example of a measured time-dependent velocity signal in graphic representation.

An example of a measured demodulated time-dependent velocity signal is shown in FIG. 7. Data were acquired over 0.5 s, and sampled at 500 kHz. The shaker target was excited with a 500 Hz vibration, driven with a peak sinusoidal velocity of 145 µm/s (as measured with an accelerometer). Only a portion of the demodulated signal is shown to emphasize the target vibration. The low-frequency part of the velocity signal comes from environmental vibration of the shaker assembly with respect to the sensor head.

Figure 8:
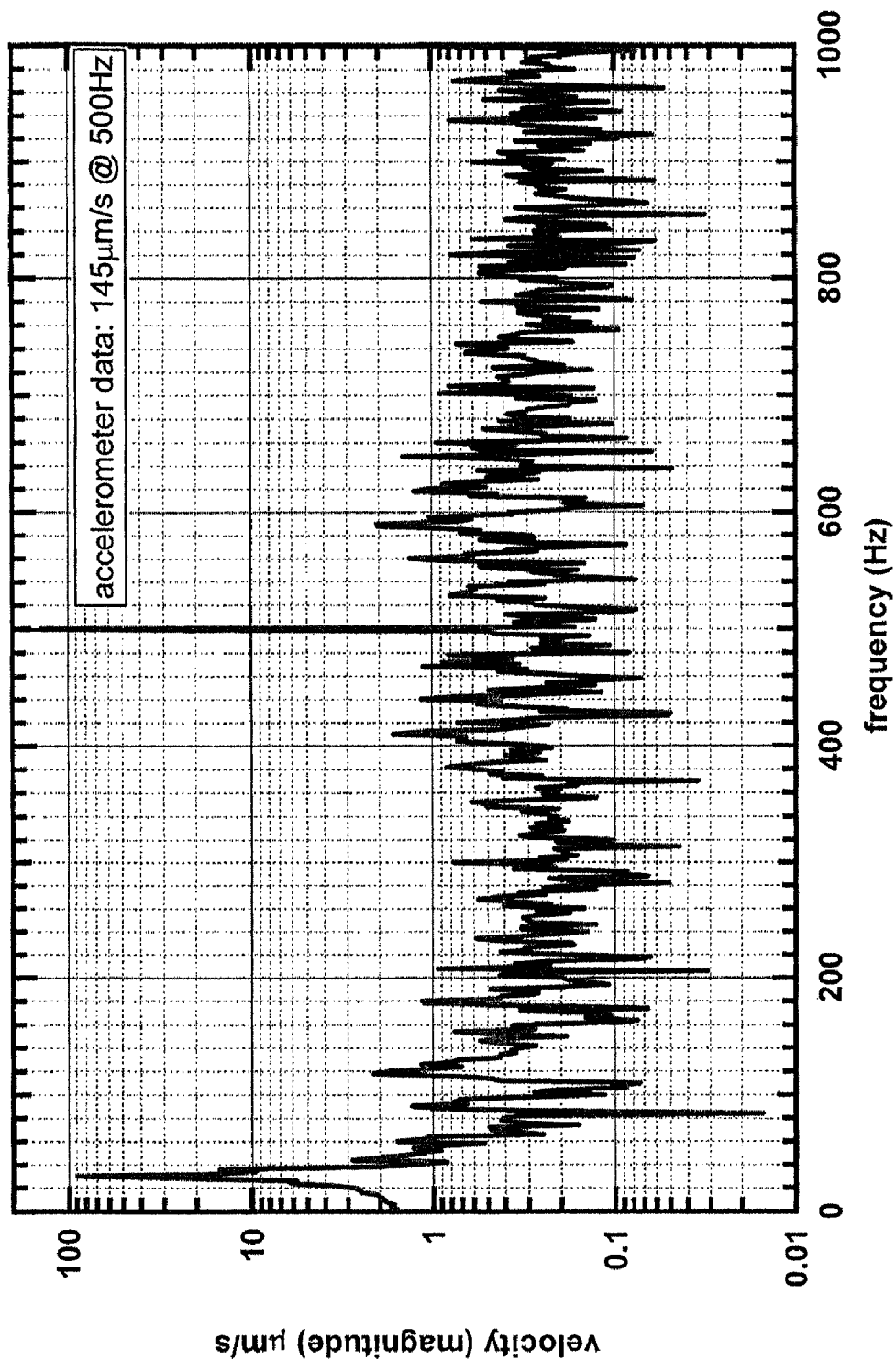
FIG. 8 illustrates a spectral analysis of the velocity, obtained by Fourier transforming the entire 0.5s velocity signal of FIG. 7.

Spectral analysis of the velocity is shown in FIG. 8, obtained by Fourier transforming the entire 0.5 s velocity signal. The 500 Hz excitation is clearly shown, as is the low-frequency environmental vibration. When the sensor head is directed into free-space all signals, and particularly the low-frequency noise near 30 Hz, disappear leaving only a low-level noise background. A similar spectrum taken at 10 times lower vibrational amplitude shows the 500 Hz target signal reduced by 10 dB, but still well above the broad-band noise floor.

It should be expressly recognized that we do not intend to limit our invention to the examples or disclosure of the preferred embodiment herein which are given by way of illustration only as those skilled in the art, upon reading the foregoing disclosure, can implement the invention with other apparatus or the present apparatus modified in its use, without departing from the spirit and scope of the invention as defined in the appended claims.

What is claimed is:

1. A non-contact optical measurement apparatus for determining surface velocity of a target comprising:
   a laser capable of producing a coherent beam of light;
   a splitter to split the beam of light into at least a reference and target beam;
   a modulator for the reference beam;
   a non-reciprocating transmitter/container to transmit the target beam and to receive a light reflected from the target; and,
   a receiver to receive the modulated reference beam and the light reflected from the target.

2. The apparatus of claim 1 wherein the modulator is a piezo-electric cylinder upon which is wound a length of optic fiber.

3. The apparatus of claim 1, further comprising a lens to focus the target beam on a target whose surface velocity is to be measured.

4. The apparatus of claim 3, wherein the non-reciprocating transmitter/container is a circulator which comprises at least an input port and an exit port and the exit port being designed to permit the exiting light to expand until it reaches the lens.

5. The apparatus of claim 1, wherein the laser is capable of emitting light at a wavelength of about 1550 nm.

6. The apparatus of claim 1, wherein the output of the laser is optically connected to an optical fiber designed for operation in the 1300-1600nm wavelength range.

7. The apparatus of claim 1, wherein the output from the splitter is optically connected to transmit the reference beam along an optical fiber designed for operation in the 1300-1600 nm wavelength range.

8. The apparatus of claim 1, further comprising a digital signal processor.

9. The apparatus of claim 1, further comprising an analog to digital converter.

10. The apparatus of claim 1, wherein the modulated reference beam and reflected beam are each optically connected to variable attenuators.

11. The apparatus of claim 10, wherein the outputs of each of the variable attenuators are operatively connected to the receiver.

12. The apparatus of claim 10, wherein the receiver is capable of generating a diode signal and further comprising means to demodulate the signal.

13. A process of taking non-contact optical measurement of the surface velocity of a target; said process comprising:
   providing a coherent light source;
   splitting the coherent light source into at least a reference and target beam;
   directing the reference light source through an optic fiber which optic fiber is wound around a piezo-electric cylinder;

directing the target beam through a lens to the target and recovering reflected light;

optically feeding the reflected light and the light from said optic fiber to a receiver;

generating a signal; and demodulating based on mixing said signal with quadrature components, passing through low-pass filters and subjecting the filtered output to a modulus operation to provide in-phase and quadrature vibrational signals.

14. The process of claim 13, wherein said step of directing includes changing the diameter of the cylinder while the reference light source is passing through said optic cable.

15. The process of claim 13, wherein said step of directing the target beam includes passing the target beam through a circulator having an input and an exit.

16. The process claim 13, wherein said step of recovering reflected light includes passing the reflected light through a circulator.

17. A process of taking non-contact optical measurement of the surface velocity of a target, said process comprising:
providing a coherent light source;
splitting the coherent light source into at least a reference and target beam;
directing the reference light source through an optic fiber which optic fiber is wound around a piezo-electric cylinder;
directing the target beam through a lens to the target and recovering reflected light;
optically feeding the reflected light and the light from said optic fiber to a receiver; and
generating, an out signal; and
demodulating based on said output signal
wherein said demodulating includes mixing the output signal with quadrature components, passing through low-pass filters and subjecting the filtered output to a modulating function to provide in-phase (I) and quadrature (Q) vibration signals.

18. The process of claim 17, further comprising demodulating the (I) and (Q) signals.

19. The process of claim 17, wherein the bandwidth of the filters exceeds the bandwidth of the vibration spectrum of the target.

* * * * *